(12) United States Patent
Thomas

(10) Patent No.: US 6,696,377 B1
(45) Date of Patent: Feb. 24, 2004

(54) CLAY SLURRY

(75) Inventor: Ronald J. Thomas, Paris, TN (US)

(73) Assignee: H. C. Spinks Clay Company Inc., Paris, TN (US)

( * ) Notice: Subject to any disclaimer, the term of this patent is extended or adjusted under 35 U.S.C. 154(b) by 0 days.

(21) Appl. No.: 09/982,758

(22) Filed: Oct. 18, 2001

(51) Int. Cl.⁷ .......................... C04B 33/04; C04B 33/28
(52) U.S. Cl. ................ 501/148; 501/141; 501/144; 501/146; 501/147; 501/149; 106/486; 106/487
(58) Field of Search .................................. 501/141, 144, 501/148, 146, 147, 149; 106/486, 487

(56) References Cited

U.S. PATENT DOCUMENTS

| | | | |
|---|---|---|---|
| 4,812,427 A | | 3/1989 | Kohut |
| 4,812,428 A | | 3/1989 | Kohut |

*Primary Examiner*—Michael Marcheschi
(74) *Attorney, Agent, or Firm*—Howard J. Greenwald

(57) ABSTRACT

A process for preparing a ball clay slurry with a casting rate of at least about 50, a modulus of rupture of at least 500 pounds per square inch, and from about 0.1 to about 1.0 weight percent of organic polyelectrolyte. In this process, a digested lignite material is mixed with a lignitic coarse clay, a nonlignitic coarse clay, a lignitic fine clay, and a polyelectrolyte dispersing agent.

14 Claims, 1 Drawing Sheet

CLAY SLURRY

FIELD OF THE INVENTION

A process for preparing a ball clay slurry comprised of water, ball clay, and a dispersing agent.

BACKGROUND OF THE INVENTION

U.S. Pat. No. 4,812,427 describes a ball clay/water slurry that contains organic polyelectrolyte. This slurry, which is sold under the name of "FLO-TECH" by the H. C. Spinks Clay Company of Paris, Tenn., has met with a substantial amount of commercial success.

Example 4 of U.S. Pat. No. 4,812,427 describes a typical "FLO-TECH" slurry which, according to the patent, had a transmission of 76 percent. For some end uses, a slurry with a higher transmission value is desired.

It is an object of this invention to provide a process for preparing a ball clay/slurry with a transmission greater than 90 percent, a casting rate in excess of 50, and a modulus of rupture in excess of 500 pounds per square inch.

SUMMARY OF THE INVENTION

In accordance with this invention, there is provided a process for preparing a ball clay slurry with a casting rate of at least about 50, a modulus of rupture of at least 500 pounds per square inch, and from about 0.1 to about 1.0 weight percent of organic polyelectrolyte. In this process, a digested lignite material is mixed with a lignitic coarse clay, a nonlignitic coarse clay, a lignitic fine clay, and a polyelectrolyte dispersing agent.

BRIEF DESCRIPTION OF THE DRAWING

The present invention will be more fully understood by reference to the following detailed description thereof, when read in conjunction with the attached drawing, wherein like reference numerals refer to like elements, and wherein.

DEFINITIONS

Figure 1:
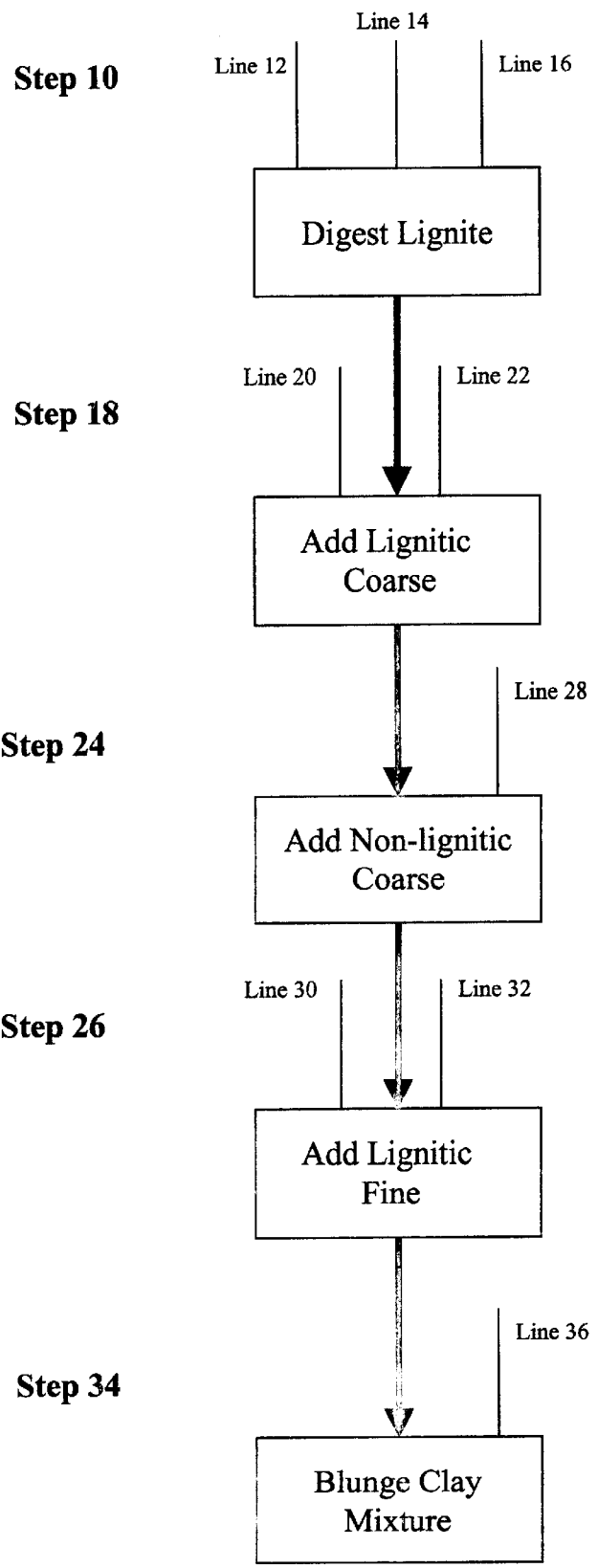
FIG. 1 is a flow diagram illustrating one process for preparing a ball clay slurry.

The following terms, which are used in this specification, are defined and described in substantial accordance with the manner they are defined and described in U.S. Pat. No. 4,812,427, the entire disclosure of which is hereby incorporated by reference into this specification; and reference should be made to such patent for a more detailed description of such terms.

Alumina Content of Ball Clay

The test for determining the alumina content of ball clay is described in U.S. Pat. No. 4,812,427. As is described in this patent, the amount of alumina in the ball clay may be determined by atomic absorption analysis, using a Perkin-Elmer Model 2380 Atomic Absorption Spectrophotometer, manufactured by the Perkin-Elmer Corporation of Norwalk, Conn. National Bureau of Standards clay standards SRM 98a and 99a are used in this test.

Ball Clay

Ball clay is a kaolinitic type of clay characterized by high plasticity, fine-grained particles, high dry strength, long vitrification range, and white to cream color after firing.

Lignitic coarse ball clay generally contains from about 20 to about 40 percent (by total weight of dry clay) of particles finer than 0.5 microns, and it usually has a specific surface area of from about 13 to about 18 square meters per gram. This clay usually contains less than about 2.0 percent, by weight of dry clay, of sodium oxide or potassium oxide. The organic matter content of the clay is from about 1 to about 5 percent, and it preferably is from about 1.5 to about 3.5 percent.

Non-lignitic coarse ball clay usually contains from about 20 to about 40 percent (by total weight of dry clay) of particles finer than 0.5 microns, and it usually has a specific surface area of from about 13 to about 18 square meters per gram. This clay usually contains less than about 3 percent, by weight of dry clay, of sodium oxide or potassium oxide. The organic content of this clay is usually from about 0.1 to about 1.5 percent, by weight of dry clay.

Lignitic fine ball clay generally contains from about 50 to about 70 percent (by total weight of dry clay) of particles finer than 0.5 microns, and it usually has a specific surface area of from about 20 to about 35 square meters per gram. This clay usually contains from about 0 to about 2 percent (by weight of dry clay) of either sodium oxide or potassium oxide. The organic material content of this clay is from about 0.5 to about 5.0 percent.

Blunger

The term blunger refers to a cylindrical vessel containing a rotating shaft with fixed knives useful for blunging. Blunging is the process of blending or suspending ceramic material in liquid by deagglomeration and agitation.

Casting Rate of the Ball Clay Slurry

The casting rate of the ball clay slurry is determined by a test in which a 300 cubic centimeter sample of the slurry, at a solids content of 60 dry weight percent of slurry, is filter pressed through a Whatman 2.5 micron No. 5 filter paper with 98 percent retention above 2.5 microns in an NL Baroid Series 300 Standard API Filter Press (manufactured by NL Industries of Houston, Tex.) at 90 pounds per square inch for 60 minutes, the filter press is then drained for five minutes, and the filter cake is weighed. The casting rate is equal to the number of grams (wet weight) in the filter cake after 60 minutes.

Casting Slip

A casting slip is a slurry of properly formulated ceramic bodies which are shaped by pouring into appropriate molds. A casting slip for sanitaryware casting is usually comprised of the following six ingredients: (1) ball clay, which is a kaolinitic type of clay characterized by high plasticity, fine-grained particles, high dry strength, long vitrification range, and a white to cream color after firing, (2) kaolin, which is a group of refractory white or nearly white-burning clays having the approximate composition $Al_2O_3.2SiO_2.2H_2O$ with a specific gravity of from about 1.28 to about 2.6, (3) feldspar, which is a group of aluminous silicate minerals of the general formula $K_2O.Al_2O_3.6SiO_2$ with a melting point of from about 1100 to about 1532 degrees Centigrade, a specific gravity of from about 2.56 to about 2.63, and a Mohs hardness of from about 6 to 6.5, (4) flint or silica, (5) water, and (6) chemical additives to modify the rheology of the slurry and the slip.

Dry Modulus of Rupture of the Ball Clay

The dry modulus of rupture of the ball clay is determined in accordance with a test in which a cast bar is prepared from 50% clay and 50% flint; this test is described in detail in U.S. Pat. No. 4,812,428.

Gallenkamp Build Up Test

This test is conducted on a Gallenkamp Universal Torsion Viscometer model VHA-200-M (manufactured by Gallenkamp, London, England), and it is described in U.S. Pat. No. 4,812,427.

Gel Test of the Ball Clay Slurry

In the gel test, the tendency of the ball clay slurry to increase in viscosity due to the development of a gel structure within the slurry at certain specified points in time is measured. The equipment used for this test is a Brookfield Viscometer, model RVTD (manufactured by the Brookfield Engineering Laboratories of Stoughton, Mass.) operated at 0.5 revolutions per minute.

Initial Viscosity of Ball Clay Slurry

The initial viscosity of the ball clay slurry is that viscosity measured one hour after the slurry has been made. Measurement is made on a freshly stirred slurry with a Brookfield Viscometer, model RVTD, equipped with a number 3 spindle and operated at 100 revolutions per minute. The reading is taken within 20 seconds or when the curve breaks.

Mica

The term mica refers to a group of mineral silicates having similar physical characteristics and atomic structures, but of varying chemical compositions, containing hydroxyl, alkali, and aluminum silicate groups. As used in this specification, the term mica refers to muscovite mica, paragonite mica, sericite mica, and mixtures thereof.

Montmorillonite

Montmorillonite minerals refer to clay minerals, except vermiculite, with an expanding structure. These minerals are described in U.S. Pat. No. 4,812,247.

Organic Content of Ball Clay

As is described in U.S. Pat. No. 4,812,427, the organic content of ball clay may be determined by a test involving involves hydrogen peroxide oxidation.

Organic Polyelectrolyte

The term organic refers to a composition which contains the element carbon and which contains or is derived from one or more hydrocarbon radicals. The term polyelectrolyte refers to a polymer which can be changed into a molecule with a number of electrical charges along its length.

In this specification, the concentration of organic polyelectrolyte is described by dry weight of active ingredient in the liquid organic polyelectrolyte, to dry weight of clay in the ball clay slurry.

Particle Size Distribution Analysis

The particle size distribution of the ball clay can be measured in accordance with the methods described below.

In view of the manner in which clay particles fracture, clay particles will have irregular shapes which, however, are of a body (or maximum side-to-side thickness) such that sub-sieve sized discrete particles will pass through a specified mesh of a sieve. The size of the discrete particles can be expressed in terms of a spherical diameter through which a day particle from a sample of clay or clay/water slurry will pass. One can use U.S. Series sieves down to about 270 mesh or 53 microns.

A Micromeritics Sedigraph Model 5100 (made by the Micromeritics Company, of Norcross, Ga.) may be used to measure the particle size distribution of the clay material in the ball clay/water slurry, in accordance with the procedure described in U.S. Pat. No. 4,812,427.

Specific surface area can be measured by nitrogen adsorption using the well known BET equation. This measurement can be conducted on a Micromeritics "Flow Sorb II 2300," model 2300/00000/00 (made by Micromeritics Company), as is described in U.S. Pat. No. 4,812,427.

Wet sieve analysis of ball clay may be conducted in accordance with A.S.T.M. test C-325-81.

Silica Content of the Ball Clay

The silica content of ball clay may be determined by standard elemental oxide analysis for clays, using atomic absorption analysis; the test described in the "Alumina content of the ball clay" definition is equally applicable here. See, e.g., the description of this test set forth in U.S. Pat. No. 4,812,427.

Slip Casting

Slip casting is a forming process in the manufacture of shaped articles in which the material to be cast is ground and mixed to a creamy slurry with water and then poured into plaster molds which rapidly absorb the added water, producing a solid body which has the inside shape of the mold; when the wall thickness of the cast item is attained, the excess slurry is poured from the mold; when the cast item has dried to sufficient strength for safe handling, it is removed from the mold for further processing.

Soluble Sulfate Content of the Ball Clay

The soluble sulfate content of the ball clay is determined in accordance with A.S.T.M. test C86-77 with a Milton Roy Spectronic 20.

Transmission of the Ball Clay Slurry Filtrate

The transmission of the filtrate of the slurry is determined by taking a 300 cc. sample of the slurry, filter-pressing it through a Whatman No. 5 filter paper with 98 percent retention above 2.5 microns in an NL Baroid Series 300 Standard API Filter Press at 90 psi. for 60 minutes, taking a 15 cubic centimeter sample of the filtrate, and testing the transmission of the filtrate sample in a Spectronic 20 using a 400 nanometer wavelength.

A PREFERRED PROCESS OF THE INVENTION

FIG. 1 is a flow diagram of one preferred process of the invention. Referring to FIG. 1, and in the preferred process depicted therein, in step 10 of the process lignite is mixed with water and its pH is adjusted so that it is at least about 9. In step 10, to a mixer (such as a blunger), water is added via line 12. The water is preferably at a temperature of at least about 40 degrees Centigrade, and more preferably is at least about 60 degrees Centigrade. In one embodiment, the temperature of the water charged via line 12 is at least about 65 degrees Centigrade.

A sufficient amount of water is charged via line 12 so that, after the clays used in the process are charged, a slurry will be formed with a solids content, by weight, of from about 60 to about 65 weight percent. Thus, e.g., in the process illustrated in the example, 2900 gallons of water were charged to achieve an ultimate solids content of 60.9 weight percent.

In one embodiment, from about 3 to about 4 weight percent of lignite, by weight of water charged, is charged via line 14. Thus, e.g., in the example presented in this specification, 860 pounds of lignite (3.55 weight percent) were charged for the 2900 gallons of water charged (which is about 24,200 pounds of water).

Lignite is a coal of low rank with a high inherent moisture and volatile matter; lignite may be divided into black lignite, brown lignite, and brown coal. See, e.g., British Standards Institute (London) "Glossary of Coal Terms," British Standard 3323, 1960 (19 pages).

In one embodiment, the lignite used contains a large quantity of water (up to about 40 percent) and is sometimes high in ash. In this embodiment, when the lignite is dried, it breaks up into fine lumps and powder. In this embodiment, the dry lignite contains from about 70 to about 80 percent of carbon, from about 10 to about 30 weight percent of oxygen, and from about 5 to about 7 weight percent of hydrogen.

In one embodiment, the lignite used is produced in Western Tennessee, in Weakley County, Tenn.

Lignites consist of lignin and humic acid for the most part, with smaller inclusions of waxes, fats, and resins. See, e.g., W. E. Worral et al., "The Organic Matter of Ball Clays," Transactions of the British Ceramic Society, volume 52, pages 528–553 (1953). Reference also may be had to column 12 of U.S. Pat. No. 4,812,427, the entire disclosure of which is hereby incorporated by reference in to this specification. Reference also may be had to U.S. Pat. No. 4,880,759, the entire disclosure of which is hereby incorporated by reference into this specification.

The mixture of lignite and water produced in step 10 preferably is at a pH of at least about 9. In one embodiment, the pH of the lignite/water mixture is at least 10 and, more preferably, at least about 10.2. When the pH is less than 9, the reaction product produced does not suffice to create a ball clay slurry with the desired properties. In this case, the slurry produced does not have adequate plasticity, or adequate strength (as measured by the dry modulus of rupture test), or adequate stability. Thus, e.g., in this case the dry modulus of rupture obtained with the ball clay slurry typically is on the order of about 500 pounds per square inch.

Referring again to FIG. 1, a pH-adjusting chemical is generally added via line 16. One may use any chemical effective to adjust the pH of aqueous systems such as, e.g., alkali metal hydroxide, alkaline metal hydroxides, alkali metal carbonates, alkaline metal carbonates, and the like.

In one embodiment, sodium hydroxide is added via line 16 to adjust the pH of the mixture to the desired value. A sufficient amount of sodium hydroxide is added to reach the desired pH. However, beyond a certain pH, additional sodium hydroxide does not appear to substantially affect the ph. Thus, at a pH of from about 11.5 to about 12, the system does not appear to further respond to additional caustic.

Aside from the desired pH, the system appears to often be sensitive to the concentration of the sodium hydroxide added. It is preferred to add from about 2.4 to about 4.2 weight percent of dry sodium hydroxide, by weight of lignite, to the lignite/water mixture. It is even more preferred to add from about 2.8 to about 3.4 weight percent of the sodium hydroxide.

Applicant has discovered that, when more than 6.0 percent of sodium hydroxide is used, the ball clay/water mixture over-deflocculates and cannot be effectively mixed.

Referring again to FIG. 1, a soluble sulfate reducing agent is preferably added via line 16. It is desired that the final slurry product contain from about 100 to about 500 parts per million, by weight of dry ball clay charged to the system. In one embodiment, from about 150 to about 250 parts per million of soluble sulfate ion are desired to be present in the slurry.

In order to reduce the concentration of the soluble sulfates, one may add an agent which forms an insoluble sulfate compound. Thus, by way of illustration, one may use a barium compound such as, e.g., barium carbonate.

A sufficient amount of the soluble sulfate reducing agent, such as barium carbonate, is added to the mixture to produce the desired soluble sulfate level after the addition of the clays and after blunging. In general, from about 0.01 to about 0.08 weight percent of the soluble sulfate reducing agent, by total weight of dry clay added to the system, is used. In one embodiment, from about 0.02 to about 0.05 weight percent of such soluble sulfate reducing agent is added.

In one embodiment, a certain sequence is used for the addition of the reagents. In this embodiment, it is preferred to add the water, the sodium hydroxide, the barium carbonate, and then the lignite to the system, with mixing. In general, the lignite is charged in a period of from about 2 to about 5 minutes, with stirring.

Applicant has discovered that, after the water, caustic, barium carbonate, and lignite have been charged to the system, it is important to allow the system to react prior to the time any clay is added. It is preferred to allow at least 5 minutes of such reaction to occur, and preferably at least about 15 minutes of such reaction to occur, prior to the time the clay is added. If such reaction time is not allowed, the slurry properties obtained are less than ideal.

After a suitable reaction time has been allowed for the water/caustic/carbonate/lignite system, lignitic coarse clay is added to this system. As is known to those skilled in the art, lignitic coarse clay generally contains from about 20 to about 40 percent (by total weight of dry clay) of particles finer than 0.5 microns, and it usually has a specific surface area of from about 13 to about 18 square meters per gram. This clay usually contains less than about 2.0 percent, by weight of dry clay, of sodium oxide or potassium oxide. The organic matter content of the clay is from about 1 to about 5 percent, and it preferably is from about 1.5 to about 3.5 percent.

In one embodiment, the ligniLic coarse clay contains at least about 1.5 weight percent of potassium oxide (by weight of dry clay) and, more preferably, at least about 2.0 weight percent of such potassium oxide. In one embodiment, the lignitic coarse clay contains from about 1.5 to about 2.5 weight percent of potassium oxide.

In one embodiment, the lignitic coarse clay contains at least about 1.5 weight percent of mica.

Referring again to FIG. 1, the lignitic coarse clay may be added in step 18. Step 18 may be conducted in the blunger in which the water/caustic/carbonate/lignite are mixed; and this is preferred. Alternatively, all the ingredients may be charged to a separate blunger/mixer to effect step 18.

Referring to FIG. 1, and in the preferred embodiment depicted, the lignitic coarse clay is charged via line 20. A dispersing agent, such as organic polyelectrolyte, is charged via line 22.

One may use one or more of the organic polyelectrolytes known to those skilled in the art. Thus, by way of illustration and not limitation, one may use the organic polyelectrolyte described in U.S. Pat. No. 4,812,427; this polyelectrolyte has a molecular weight of from about 1,400 to about 6,000. The entire disclosure of such U.S. patent is hereby incorporated by reference into this specification.

The amount of organic polyelectrolyte charged via line 22 is calculated based upon the weight of the active ingredient in the polyelectrolyte. Thus, and referring to column 24 of U.S. Pat. No. 4,812,428, Colloid 211 is a liquid sodium polyacrylate with a solids content of 43 percent (active ingredient).

The concentration of organic polyelectrolyte charged via line 22, based upon the weight of dry lignitic coarse clay (which contains less than 1.0 weight percent of moisture), is generally from about 0.1 to about 0.26 weight percent of active ingredient, based upon the dry weight of lignitic coarse clay.

In one embodiment, from about 3 to about 6 gallons of "ACUMER 9400" sodium polyacrylate (sold by the Rohm & Haas Company of New Jersey) is added to the reaction mixture for each 12,965 pounds of undried lignitic coarse clay. This organic polyelectrolyte contains 42.5 weight percent of active ingredient, in the form of solids in water. The molecular weight of this polyelectrolyte is from about 3,300 to about 3,900.

In general, it is preferred to use an organic polyelectrolyte with a molecular weight of from about 2,000 to about 4,000.

In one aspect of the embodiment depicted in FIG. 1, all of the polyectrolyte is added when the lignitic coarse clay is added via line 20, or shortly thereafter. In another aspect of this embodiment, some or all of the polyelectrolyte is added when nonlignitic coarse clay is added. In yet another aspect of this embodiment, some or all of the polyelectrolyte is added when lignitic fine clay is added.

After the addition of the lignitic coarse clay in step 18, and/or some or all of the polyelectrolyte, the mixture is stirred. One may use a conventional blunger to effect this stirring; see, e.g., U.S. Pat. No. 4,812,427, the entire disclosure of which is hereby incorporated by reference into this specification.

After the addition of the lignitic coarse clay in step 18, and in step 24, non-lignitic coarse clay and/or lignitic fine clay (see step 26) are added, with stirring and, optionally, polyelectrolyte addition. In the sequence illustrated in FIG. 1, the non-lignitic coarse clay is added prior to the lignitic fine clay. In another embodiment, not shown, the lignitic fine clay is added prior to the non-lignitic coarse clay.

As is known to those skilled in the art, non-lignitic coarse clay usually contains from about 20 to about 40 percent (by total weight of dry clay) of particles finer than 0.5 microns, and it usually has a specific surface area of from about 13 to about 18 square meters per gram. This clay usually contains less than about 3 percent, by weight of dry clay, of sodium oxide or potassium oxide. The organic content of this clay is usually from about 0.1 to about 1.5 percent, by weight of dry clay.

In general, it is preferred to use from about 25 to about 40 weight percent, by undried weight of clay, of the non-lignitic coarse, by total weight of the undried lignitic coarse clay and the non-lignitic coarse clay and the lignitic fine clay. The lignitic coarse clay is present in the slurry at a concentration of from about 15 to about 25 weight percent, by total weight of undried clay. The lignitic fine clay is present in the slurry at a concentration of from about 40 to about 50 weight percent, by total weight of the undried clay.

Referring again to FIG. 1, and in the preferred embodiment depicted therein, the non-lignitic coarse clay is added in step 24. This clay may be added to the same blunger/reaction vessel to which the water, the sodium hydroxide, the barium carbonate, the lignite, and the lignitic coarse clay has been added. Alternatively, each of these prior reagents may be transferred to a separate reaction vessel to which the non-lingitic coarse clay is added.

In step 24, some or all of the organic polyelectrolyte added to the system may be added via line 28. Additionally, the non-lignitic coarse clay also may be added via line 28.

During the addition of the non-lignitic coarse clay, a portion or all of the total amount of organic polyelectrolyte may be added. The total amount of polyectrolyte added to the system generally is from about 0.1 to about 0.26 weight percent, based upon the weight of the dry lignitic coarse clay charged to the system. It is preferred, in one embodiment, the charge the total amount of such polyectrolyte in several steps.

It is preferred to add the polyelectrolyte in different portions at least two separate points in time. In general, at least one addition of polyelectrolyte will occur after the lignitic coarse clay has been added to the blunger. It is preferred to make at least one addition of polyectrolyte after all of the clays have been added to the blunger. In one embodiment, at least two additions of polyelectrolyte occur after the lignitic coarse clay has been added to the blunger.

In one embodiment, at least three separate additions of the polyelectrolyte are made during the process. In another embodiment, at least four separate additions of the polyelectrolyate are made during the process.

Referring again to FIG. 1, and in the preferred embodiment depicted therein, in step 26 lignitic fine clay is added to the reaction mixture via line 30. In this embodiment, polyelectrolyte dispersing agent may be added to the system via line 32. As before, all the reagents may be added to the same blunger/mixer.

After all of the clays have been added to the reaction system, blunging of the mixture occurs in step 34. It is preferred to continue this blunging for at least about 30 minutes and, more preferably, at least about 40 minutes. During this blunging step 34, additional polyectrolyte dispersant may be added vial line 36.

Properties of the Ball Clay/water Slurry

The ball clay/water slurry of this invention preferably has a solids content of from about 58 to about 68 weight percent, by weight of dry clay. It is preferred that the solids content of the slurry be from about 60 to 65 dry weight percent of ball clay.

The slurry of this invention preferably has a transmission of at least about 85 percent. In one embodiment, the slurry has a transmission of at least about 88 percent.

The slurry of this invention has a dry modulus of rupture of at least about 500 pounds per square inch. In one embodiment, the modulus of rupture of the slurry is from about 550 to about 600 pounds per square inch. In another embodiment, the modulus of rupture of the slurry is from about 600 to about 650 pounds per square inch.

The slurry of this invention has a casting rate of from 48 to 85. In one embodiment, the slurry has a casting rate of from 50 to about 56. In another embodiment, the slurry has a casting rate of from about 65 to about 72.

The slurry of this invention contains from about 23 to about 29 weight percent of alumina, by weight of dry ball clay. The slurry also contains from about 58 to about 63 weight percent of silica, by weight of dry ball clay.

The slurry of this invention has a gel curve which indicates excellent stability properties. When the Brookfield viscosity of a freshly stirred slurry is plotted against time, a gel curve is produced with different viscosity values. For the period of 15 minutes, the curve is described by the equation $V=mT^n$, wherein V is the viscosity (in centipoises), m is a shape constant determined empirically from the shape of the curve, T is time, in minutes, and n is the exponential curve slope.

The slurries of this invention, from 0 minutes to 15 minutes, have n value of from about 0.2 to about 0.3 and, preferably, from about 0.2 to about 0.24. In the preferred embodiment, wherein n is from about 0.2 to about 0.24, the viscosity value at 5 minutes is at least 70 percent of the viscosity value at 15 minutes.

In one embodiment, the slurry of this invention will contain less than about 0.75 weight percent of carbon, by weight of dry ball clay. In this embodiment, the slurry will contain less than about 0.6 weight percent of carbon.

In one embodiment, slurry of this invention has a particle size distribution such that, when a plot is made of the logarithm of the "cumulative percent finer than" (CPFT, see U.S. Pat. No. 4,882,006 of James E. Funk) versus the logarithm of the equivalent spherical diameter of the particles in the slurry (as measured by the aforementioned Micromeritics Sedigraph 5100) between the diameters of 10 microns and 1 micron, a linear plot is obtained whose slope can be calculated and is preferably at least about 0.24 and, more preferably, at least about 0.25. In one embodiment, such slope is from about 0.26 to about 0.31.

In one embodiment, the slurry of this invention has a specific surface area of less than about 17 square meters per gram and, preferably, from about 14 to about 17 square meters per gram.

The following examples are presented to illustrate the claimed invention but are not to be deemed limitative thereof. Unless otherwise specified, all parts are by weight and all temperatures are in degrees Centigrade.

EXAMPLE 1

To a blunger is added 2,900 gallons of water at a temperature of about 165 degrees Fahrenheit. Thereafter, to the hot water was added 27 pounds sodium hydroxide flakes and 20 pounds of barium carbonate powder.

The reaction mixture was stirred at a mixing rate of 155 revolutions per minute. Thereafter, 860 pounds of lignite were added to the mixture. The lignite used was obtained from Weakley County, Tenn.

After the lignite addition, the mixture was stirred for about 15 minutes. Thereafter, the pH of the reaction mixture was checked and was found to be 10.24. Thereafter, 12,965 pounds of lignitic coarse clay, 22,130 pounds of nonlignitic coarse clay, and 29,750 pounds of lignitic fine clay were loaded into a hopper sequentially and thereafter added to the blunger over a period of about 30 minutes, with stirring. The lignitic coarse clay, the nonlignitic coarse clay, and the lignitic fine clay correspond, respectively, to the clays described and used in examples 1, 2, and 3 of U.S. Pat. No. 4,812,427, the entire disclosure of which is hereby incorporated by reference into this specification.

After the addition of the 64,845 pounds per clay, mixing continued for an additional period of 40 minutes. Five minutes into this 40 minute mixing period, dispersing agent addition commenced.

At the 5 minute period, approximately 1 gallon of the polyacrylate was added. The polyacrylate used in these examples is ACUMER 9400, which is described elsewhere in this specification.

Thereafter, over the remaining 35 minute period, 3.5 gallons of the polyacryate were added in increments of about 1 gallon, 1 gallon, 1 gallon, and 0.5 gallons. These increments were added at the 15, 30, 35, and 40 minute time periods, respectively.

After the addition of the polyacrylate dispersant, the slurry was tested to determine its properties. The slurry produced in the experiment of this example had a transmission of 92.2, a soluble sulfate concentration of 182 parts per million, a specific surface area of 18.15 meters squared per gram, a dry modulus of rupture of 635 pounds per square inch, a concentration of particles smaller than 0.5 microns of 38.4 percent, a casting rate of 51.05, a silica content of 59.9 percent, an alumina content of 25.6.

EXAMPLE 2

When the experiment of example 1 repeated with the use of 55 pounds of sodium hydroxide rather than 27 pounds, a viscous mixture which cannot be blunged is formed.

EXAMPLE 3

When the experiment of example 1 is repeated with the use 10 pounds of sodium hydroxide rather than 27 pounds, a viscous mixture which cannot be blunged is formed.

EXAMPLE 4

When the experiment of example 1 is repeated with the use of 15 gallons of polyacrylate rather than 4.5 gallons, a product with a transmission of less than It is to be understood that the foregoing description and example are illustrative only and that changes can be made in the ingredients and their proportions and in the sequence of combination and process steps as well as in other aspects of the invention discussed without departing from the scope of the invention as defined in the following claims.

I claim:

1. A process for preparing a ball clay slurry with a casting rate of at least about 50, a modulus of rupture of at least 500 pounds per square inch, and from about 0.1 to about 1.0 weight percent of organic polyelectrolyte comprising the steps of:

(a) mixing water and lignite to produce a lignite and water mixture with a pH, wherein from about 3 to about 4 weight percent of said lignite, by weight of said water, is mixed with said water;

(b) adjusting the pH of said lignite and water mixture with a pH adjusting material until said pH is at least about 9, (c) mixing said lignite and water mixture with lignitic coarse ball clay, thereby producing a mixture of lignitic coarse ball clay, lignite, and water, wherein:
  i. said lignitic coarse ball clay is comprised of from about 20 to about 40 weight percent, of particles finer than about 0.5 microns and has a specific surface area of from about 13 to about 18 square meters per gram, and
  ii. said lignitic coarse ball clay is comprised of from about 1 to about 5 weight percent of organic matter, (d) adding to said mixture of lignitic coarse ball clay, lignite, and waters additional materials including organic polyelectroylate, non-lignitic coarse clay, and lignitic fine clay, thereby forming a blunge mixture, wherein:

i. said mixture contains from about 15 to about 25 weight percent of said lignitic coarse ball clay, from about 25 to about 40 weight percent of said non-lignitic coarse clay, and from about 40 to about 50 weight percent of said lignitic fine ball clay, by total weight of said lignitic coarse ball clay, said non-lignitic coarse ball clay, and said lignitic fine ball clay, ii. said non-lignitic coarse ball clay has a specific surface area of from about 13 to about 18 square meters per gram, iii. said lignitic fine ball clay is comprised of from about 50 to about 70 weight percent of particles finer than 0.5 microns, and it has a specific surface area of from about 20 to about 35 square meters per gram, and iv. from about 0.1 to about 0.26 weight percent of organic polyelectrolyte (weight of active ingredient by total dry weight of said lignitic coarse ball clay, non-lignitic coarse ball clay, and lignitic fine ball clay) is added to said mixture of lignitic coarse ball clay, non-lignitic coarse ball clay, lignitic fine ball clay, lignite and water; and (e) mixing said blunge mixture for at least about 30 minutes.

2. The process as recited in claim 1, wherein said mixture of lignite and water is adjusted with said pH adjusting material until its pH is at least about 10.

3. The process as recited in claim 2, wherein said pH adjusting material is sodium hydroxide.

4. The process as recited in claim 3, wherein from about 2.4 to about 4.2 weight percent of dry sodium hydroxide, by weight of said lignite, is added to said mixture of lignite and water.

5. The process as recited in claim 4, further comprising the step of adding from about 0.01 to about 0.08 weight percent of soluble sulfate reducing agent to said lignite and water mixture.

6. The process as recited in claim 5, wherein said sodium sulfate reducing agent is barium carbonate.

7. The process as recited in claim 6, wherein said lignitic coarse ball clay is comprised of at least about 1.5 weight percent, by weight of dry clay, of potassium oxide.

8. The process as recited in claim 7, wherein said lignitic coarse ball clay is comprised of from about 1.5 to about 2.5 weight percent, by weight of dry clay, of potassium oxide.

9. The process as recited in claim 6, wherein said lignitic coarse ball clay is comprised of at least about 1.5 weight percent, by weight of dry clay, of mica.

10. The process as recited in claim 6, wherein said organic polyelectrolyte is an organic polyacrylate.

11. The process as recited in claim 8, wherein said organic polyelectrolyte is an organic polyacrylate.

12. The process as recited in claim 11, wherein said organic polyacrylate is sodium polyacrylate.

13. The process as recited in claim 12, wherein said sodium polyacrylate has a molecular weight of from about 3,300 to about 3,900.

14. The process as recited in claim 12, wherein said sodium polyacrylate has a molecular weight of from about 2,000 to about 4,000.

* * * * *